(12) United States Patent
Shin et al.

(10) Patent No.: US 11,423,877 B2
(45) Date of Patent: Aug. 23, 2022

(54) ROBOT FOR PROVIDING GUIDANCE SERVICE USING ARTIFICIAL INTELLIGENCE AND METHOD OF OPERATING THE SAME

(71) Applicant: LG Electronics Inc., Seoul (KR)

(72) Inventors: Wonho Shin, Seoul (KR); Jichan Maeng, Seoul (KR)

(73) Assignee: LG Electronics Inc., Seoul (KR)

(*) Notice: Subject to any disclaimer, the term of this patent is extended or adjusted under 35 U.S.C. 154(b) by 171 days.

(21) Appl. No.: 16/621,960

(22) PCT Filed: Jul. 5, 2019

(86) PCT No.: PCT/KR2019/008311
§ 371 (c)(1),
(2) Date: Dec. 12, 2019

(87) PCT Pub. No.: WO2021/006363
PCT Pub. Date: Jan. 14, 2021

(65) Prior Publication Data
US 2021/0295821 A1    Sep. 23, 2021

(51) Int. Cl.
*G10L 15/00* (2013.01)
*G05D 1/00* (2006.01)
(Continued)

(52) U.S. Cl.
CPC .......... *G10L 15/005* (2013.01); *G05D 1/0088* (2013.01); *G06N 3/04* (2013.01);
(Continued)

(58) Field of Classification Search
CPC ..... G10L 15/005; G10L 15/26; G05D 1/0088; G06K 9/00288; G06K 9/00664; G06N 3/04; G06N 3/08
See application file for complete search history.

(56) References Cited

U.S. PATENT DOCUMENTS

2013/0266925 A1   10/2013   Nunamaker et al.
2016/0103690 A1   4/2016    Kim et al.
(Continued)

FOREIGN PATENT DOCUMENTS

CN   108182098    6/2018
JP   2016524189   8/2016
(Continued)

OTHER PUBLICATIONS

International Search Report in International Appln. No. PCT/KR2019/008311, dated Apr. 2, 2020, 22 pages (with English translation).

*Primary Examiner* — Kevin Ky
(74) *Attorney, Agent, or Firm* — Fish & Richardson P.C.

(57) ABSTRACT

A robot for providing a guidance service in a first language using artificial intelligence includes a microphone configured to receive voice data, a camera configured to acquire image data, an output unit, and a processor configured to determine a second language used to provide the guidance service based on one or more of the voice data or the image data, change the language used to provide the guidance service from the first language to the second language when the determined second language is different from the first language and output the guidance service through the output unit in the changed second language.

8 Claims, 5 Drawing Sheets

(51) Int. Cl.
*G06N 3/04* (2006.01)
*G06N 3/08* (2006.01)
*G10L 15/26* (2006.01)
*G06V 20/10* (2022.01)
*G06V 40/16* (2022.01)

(52) U.S. Cl.
CPC ............... *G06N 3/08* (2013.01); *G06V 20/10* (2022.01); *G06V 40/172* (2022.01); *G10L 15/26* (2013.01)

(56) References Cited

U.S. PATENT DOCUMENTS

| | | | |
|---|---|---|---|
| 2017/0125008 A1 | 5/2017 | Maisonnier et al. | |
| 2018/0336226 A1* | 11/2018 | Anorga | G06N 20/00 |
| 2019/0341050 A1* | 11/2019 | Diamant | H04N 7/155 |
| 2021/0074295 A1* | 3/2021 | Moreno | G10L 15/26 |

FOREIGN PATENT DOCUMENTS

| | | | | |
|---|---|---|---|---|
| KR | 20170027705 | | 3/2017 | |
| KR | 20180097040 | | 8/2018 | |
| WO | WO-2020152773 A1 * | | 7/2020 | G06Q 10/02 |

\* cited by examiner

| Priority | Language |
|---|---|
| 1 | KOREAN |
| 2 | JAPANESE |
| 3 | CHINSE |

FIG. 11

ROBOT FOR PROVIDING GUIDANCE SERVICE USING ARTIFICIAL INTELLIGENCE AND METHOD OF OPERATING THE SAME

CROSS-REFERENCE TO RELATED APPLICATIONS

This application is a National Stage application under 35 U.S.C. § 371 of International Application No. PCT/KR2019/008311, filed on Jul. 5, 2019. The disclosure of the prior application is incorporated by reference in its entirety.

TECHNICAL FIELD

The present invention relates to a robot and, more particularly, to a robot capable of providing a guidance service using artificial intelligence.

BACKGROUND ART

Recently, with explosive increase in number of passengers who use airports and efforts to leap into smart airports, methods of providing services using robots in airports or multiplexes have been discussed.

When intelligent robots are introduced into airports or multiplexes, it is expected that the robots can perform the unique roles of people which cannot be replaced with conventional computer systems, thereby achieving quantitative and qualitative improvement of the provided services.

One of the most important functions of the robots in places where many people gather, including the airports, is to provide users with information such as guidance information.

A robot provides a guidance service in any one of a plurality of languages. However, currently, since a user selects a language to be used or a robot recognizes a language to be used by a user and provides a language service, provision of the language service may be delayed, thereby causing user inconvenience.

DISCLOSURE

Technical Problem

An object of the present invention is to provide a robot capable of automatically recognizing a language to be used by a user and providing a guidance service.

Another object of the present invention is to provide a robot capable of recognizing a language to be used without separate input of a user and outputting a guidance service in the recognized language.

Technical Solution

According to an embodiment of the present invention, a robot for providing a guidance service in a first language using artificial intelligence includes a microphone configured to receive voice data, a camera configured to acquire image data, an output unit, and a processor configured to determine a second language used to provide the guidance service based on one or more of the voice data or the image data, change the language used to provide the guidance service from the first language to the second language when the determined second language is different from the first language and output the guidance service through the output unit in the changed second language.

According to an embodiment of the present invention, a method of operating a robot for providing a guidance service in a first language using artificial intelligence includes acquiring one or more of voice data or image data, determining a second language used to provide the guidance service based on one or more of the voice data or the image data, changing the language used to provide the guidance service from the first language to the second language when the determined second language is different from the first language, and outputting the guidance service in the changed second language.

Advantageous Effects

According to the embodiment of the present invention, a robot can automatically recognize a language to be used by a user and provide a guidance service in the recognized language. Therefore, the user can rapidly receive the guidance service in the language used by the user without input of selecting a language or a voice command, thereby greatly improving convenience.

BEST MODE

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

Figure 1:
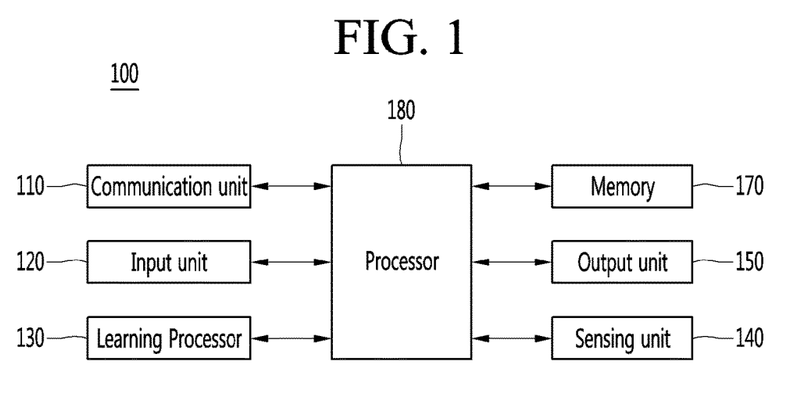
FIG. 1 is a diagram showing an artificial intelligence (AI) device according to an embodiment of the present invention.

FIG. 1 illustrates an AI device 100 according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
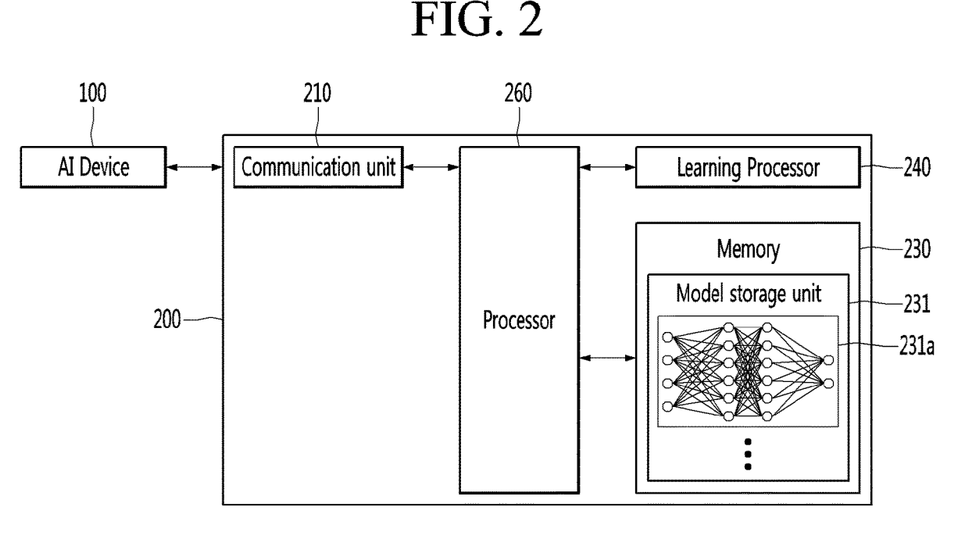
FIG. 2 is a diagram showing an AI server according to an embodiment of the present invention.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
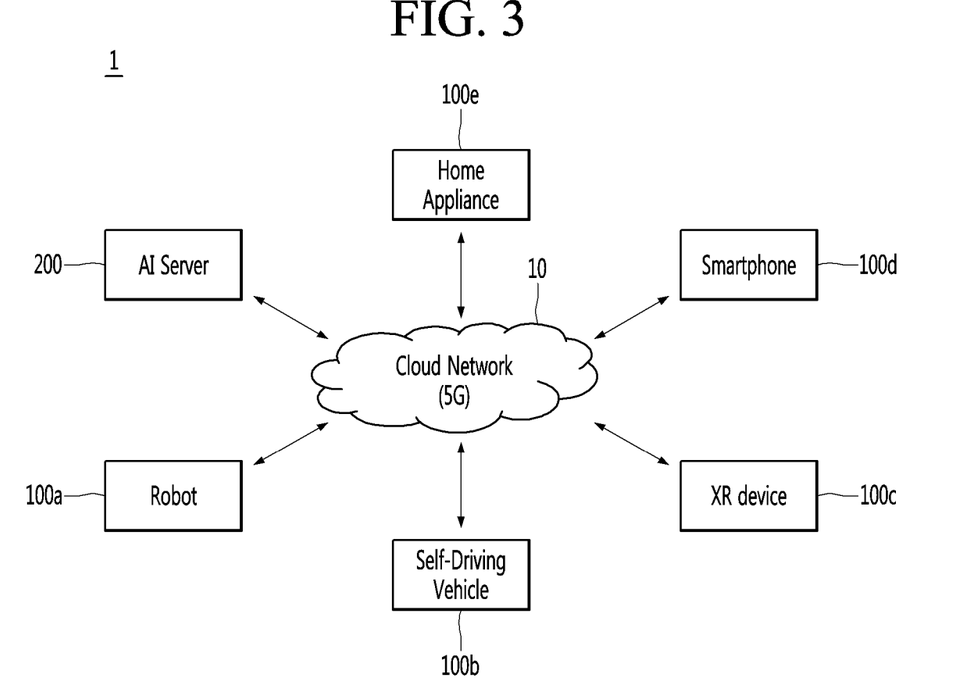
FIG. 3 is a diagram showing an AI system according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external apparatus to determine the travel route and the travel plan, and may control the driving unit such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driving unit based on the control/interaction of the user. At this time, the self-driving vehicle 100*b* may acquire the intention information of the interaction due to the user's operation or speech utterance, and may determine the response based on the acquired intention information, and may perform the operation.

<AI+XR>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

At this time, the XR device 100*c* may perform the operation by generating the result by directly using the learning model, but the sensor information may be transmitted to the external device such as the AI server 200 and the generated result may be received to perform the operation.

<AI+Robot+Self-Driving>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

At this time, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

<AI+Robot+XR>

The robot 100*a*, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100*a*, to which the XR technology is applied, may refer to a robot that is subjected to control/interaction in an XR image. In this case, the robot 100*a* may be separated from the XR device 100*c* and interwork with each other.

When the robot 100*a*, which is subjected to control/interaction in the XR image, may acquire the sensor information from the sensors including the camera, the robot 100*a* or the XR device 100*c* may generate the XR image based on the sensor information, and the XR device 100*c* may output the generated XR image. The robot 100*a* may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
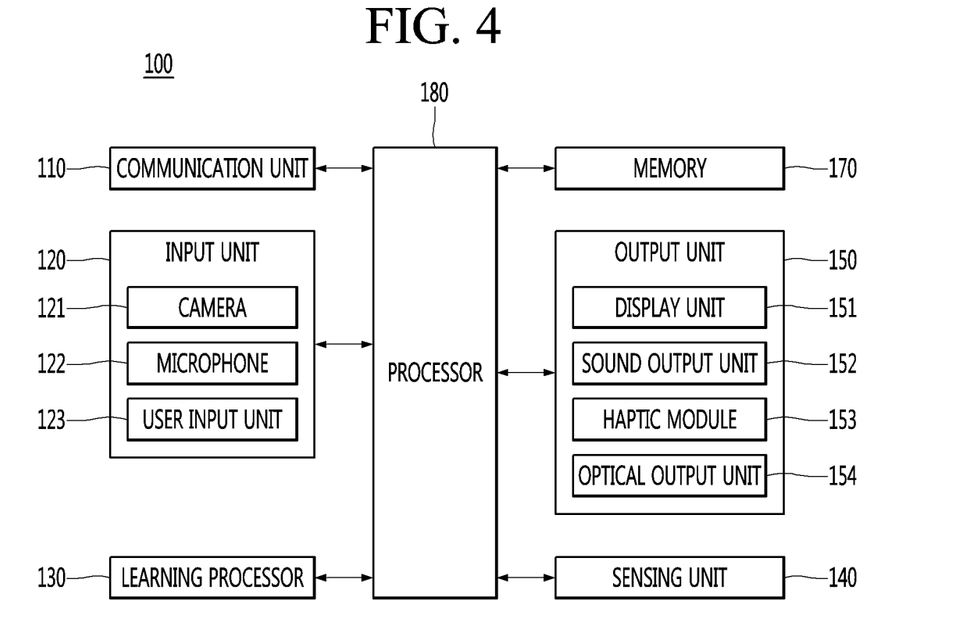
FIG. 4 is a diagram showing an AI device according to another embodiment of the present invention.

FIG. 4 shows an AI device 100 according to an embodiment of the present invention.

A repeated description of FIG. 1 will be omitted.

Referring to FIG. 4, an input unit 120 may include a camera 121 for receiving a video signal, a microphone 122 for receiving an audio signal and a user input unit 123 for receiving information from a user.

Audio data or image data collected by the input unit 120 may be analyzed and processed as a control command of the user.

The input unit 120 receives video information (or signal), audio information (or signal), data or information received from the user, and the AI device 100 may include one or a plurality of cameras 121 for input of the video information.

The camera 121 processes an image frame such as a still image or a moving image obtained by an image sensor in a video call mode or a shooting mode. The processed image frame may be displayed on a display unit 151 or stored in a memory 170.

The microphone 122 processes external acoustic signals into electrical sound data. The processed sound data may be variously utilized according to the function (or the application program) performed in the AI device 100. Meanwhile, various noise removal algorithms for removing noise generated in a process of receiving the external acoustic signal is applicable to the microphone 122.

The user input unit 123 receives information from the user. When information is received through the user input unit 123, a processor 180 may control operation of the AI device 100 in correspondence with the input information.

The user input unit 123 may include a mechanical input element (or a mechanical key, for example, a button located on a front/rear surface or a side surface of the terminal 100, a dome switch, a jog wheel, a jog switch, and the like) and a touch input element. As one example, the touch input element may be a virtual key, a soft key or a visual key, which is displayed on a touchscreen through software processing, or a touch key located at a portion other than the touchscreen.

An output unit 150 may include at least one of a display unit 151, a sound output unit 152, a haptic module 153, and an optical output unit 154.

The display unit 151 displays (outputs) information processed in the AI device 100. For example, the display unit 151 may display execution screen information of an application program executing at the AI device 100 or user interface (UI) and graphical user interface (GUI) information according to the execution screen information.

The display unit 151 may have an inter-layered structure or an integrated structure with a touch sensor so as to implement a touchscreen. The touchscreen may provide an output interface between the terminal 100 and a user, as well as functioning as the user input unit 123 which provides an input interface between the AI device 100 and the user.

The sound output unit 152 may output audio data received from a communication unit 110 or stored in the memory 170 in a call signal reception mode, a call mode, a record mode, a voice recognition mode, a broadcast reception mode, and the like.

The sound output unit 152 may include at least one of a receiver, a speaker, a buzzer or the like.

The haptic module 153 may generate various tactile effects that can be felt by a user. A representative example of tactile effect generated by the haptic module 153 may be vibration.

The optical output unit 154 may output a signal indicating event generation using light of a light source of the AI device 100. Examples of events generated in the AI device 100 may include a message reception, a call signal reception, a missed call, an alarm, a schedule notice, an email reception, an information reception through an application, and the like.

Figure 5:
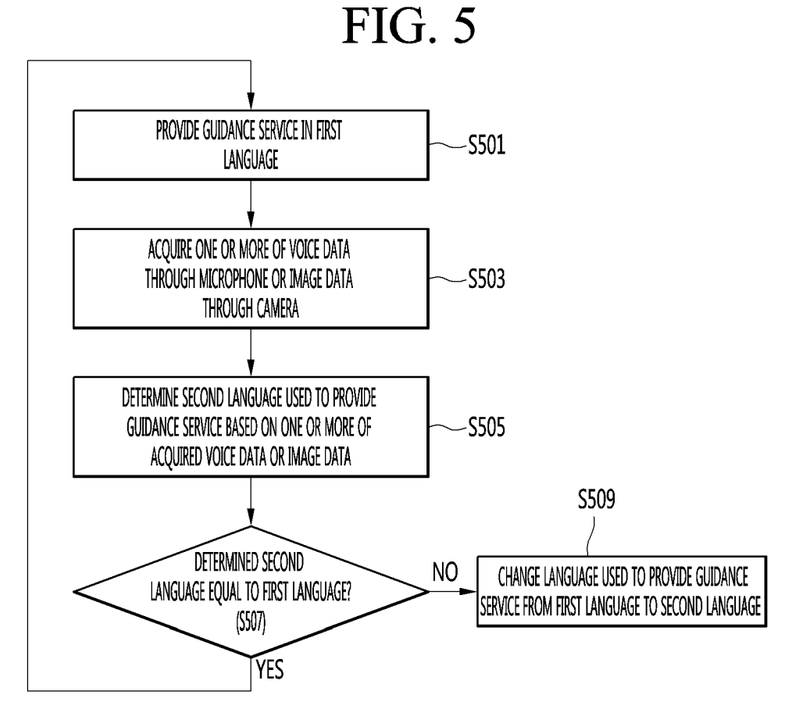
FIG. 5 is a flowchart illustrating a method of operating a robot for providing a guidance service using artificial intelligence according to an embodiment of the present invention.

FIG. 5 is a flowchart illustrating a method of operating a robot for providing a guidance service using artificial intelligence according to an embodiment of the present invention.

The processor 180 of the robot 100a provides a guidance service in a first language (S501).

The guidance service may provide information intended by a user, such as guiding the user.

The processor 180 may output guidance service information through the display unit 151 or the sound output unit 152.

The processor 180 may output guidance service information in a first language. The first language may be a previously set language, a language of a country where the robot 100a is located, or a language set by default.

The processor 180 acquires one or more of voice data through the microphone 122 or image data through the camera 121 (S503).

The voice data may be data corresponding to voice uttered by the user around the robot 100a.

The image data may be data of an image of a user captured around the robot 100a.

The processor 180 determines a second language used to provide the guidance service based on one or more of the acquired voice data or image data (S505).

The processor 180 may recognize a language corresponding to the voice data from the voice data and determine the recognized language as the second language used to provide the guidance service.

The processor 180 may recognize the passport or face of the user from the image data and determine a language corresponding to the recognized passport or face as the second language.

In another example, the processor 180 may recognize a language from the voice data and the image data and determine the recognized language as the second language.

In another example, the processor 180 may acquire a plurality of language candidates based on one or more of the voice data or the image data and determine the second language based on respective priorities of the plurality of acquired language candidates.

Step S505 will be described with reference to the following drawings.

Figure 6:
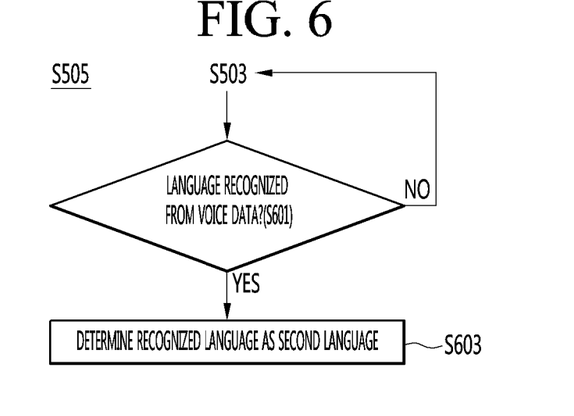
FIG. 6 is a flowchart illustrating a process of determining a second language based on voice data according to an embodiment of the present invention.

First, FIG. 6 is a flowchart illustrating a process of determining a second language based on voice data according to an embodiment of the present invention.

The processor 180 of the robot 100a determines whether a language is recognized from the voice data (S601).

The processor 180 may convert the voice data into text data using a speech-to-text (STT) engine.

The processor 180 may recognize a language corresponding to the converted text data using a language recognition model. The language recognition model may be an artificial neural network based model for recognizing a language corresponding to text data using text data.

The language recognition model may be learned by a deep learning algorithm or a machine learning algorithm.

The language recognition model may be received from the AI server 200 and stored in the memory 170.

The language recognition model may recognize words configuring text data, letters configuring a word or phonemes configuring a letter.

The language recognition model may be learned through supervised learning. Learning data for learning the language recognition model may include text data and a language labeled with the same.

The language recognition model may infer a language of text data using text data and a language which is correct answer data.

The processor 180 may infer a language corresponding to the text data using the language recognition model.

The processor 180 may determine that the language is not recognized, when the probability value of the inferred language is less than 0.7.

When the language is recognized, the processor 180 determines the recognized language as the second language used to provide the guidance service (S603).

Next, FIG. 7 will be described.

Figure 7:
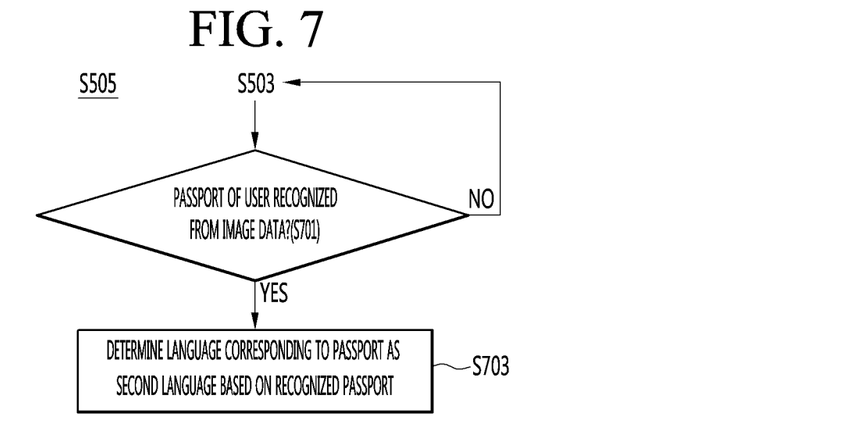
FIG. 7 is a flowchart illustrating a process of determining a second language used by a user from image data according to an embodiment of the present invention.

FIG. 7 is a flowchart illustrating a process of determining a second language used by a user from image data according to an embodiment of the present invention.

The processor 180 determines whether the passport of the user is recognized from the image data (S701).

The processor 180 may recognize the passport of the user using an object recognition model.

The object recognition model may be an artificial neural network based learning model capable of recognizing an object included in an image based on image data.

The object recognition model may be received from the AI server 200 and stored in the memory 170.

The object recognition model may be learned through supervised learning. The learning data of the object recognition model may be image data and an object labeled with the same.

The object recognition model may infer the object using the image data and the labeling data. Here, the object may be a passport.

When the passport of the user is recognized, the processor 180 determines a language corresponding to the passport as the second language based on the recognized passport (S703).

The processor 180 may determine the second language based on the shape of the recognized passport or text described on the passport.

The processor 180 may store a plurality of passport shapes respectively corresponding to a plurality of countries in the memory 170 and compare the shape of the recognized passport with the plurality of stored passport shapes, thereby searching for a matched shape.

The processor 180 may determine the language of the passport as the second language according to the result of matching.

The processor 180 may recognize text data from the image data including the passport and recognize the language using the recognized text data.

The processor 180 may recognize text described on the passport from the passport using an optical character recognition scheme and recognize the country of the passport from the recognized text. The processor 180 may determine the language of the recognized country as the second country.

Next, FIG. 8 will be described.

Figure 8:
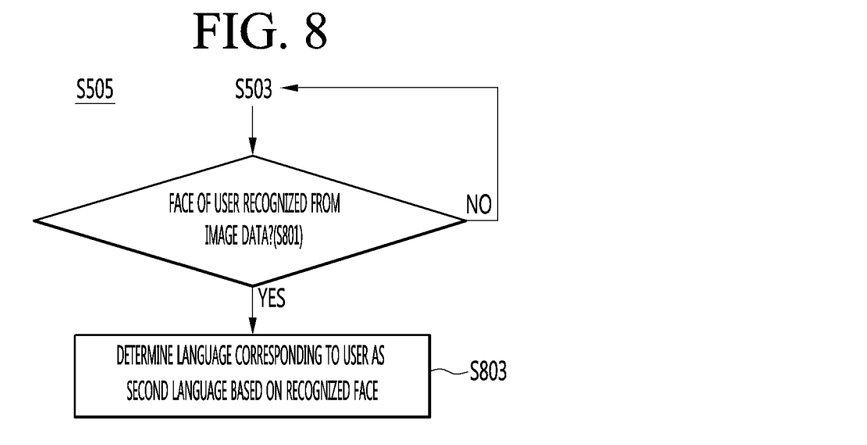
FIG. 8 is a flowchart illustrating an example of determining a second language used by a user from image data according to another embodiment of the present invention.

FIG. 8 is a flowchart illustrating an example of determining a second language used by a user from image data according to another embodiment of the present invention.

The processor 180 determines whether the face of the user is recognized from the image data (S801).

The processor 180 may recognize the face of the person from the image data using a face recognition model. The face recognition model may be an artificial neural network based model for recognizing the face of the person using the image data.

The face recognition model may be supervised-learned using a deep learning algorithm or a machine learning algorithm.

The learning data of the face recognition model may include faces of a specific country labeled with image data and correct answer data.

The face recognition model may infer a country corresponding to the face of a person extracted from the image data.

The processor 180 may determine the language of the inferred country as the second country.

When the face of the user is recognized, the processor 180 determines a language corresponding to the face of the user as the second language (S803).

Figure 9:
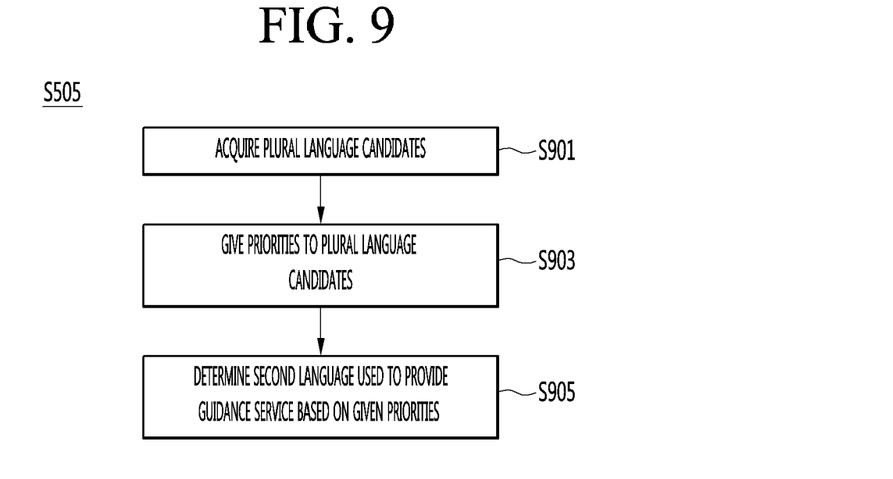
FIGS. 9 and 10 are views illustrating an example of determining a second language based on respective priorities of a plurality of language candidates according to an embodiment of the present invention.
Figure 10:
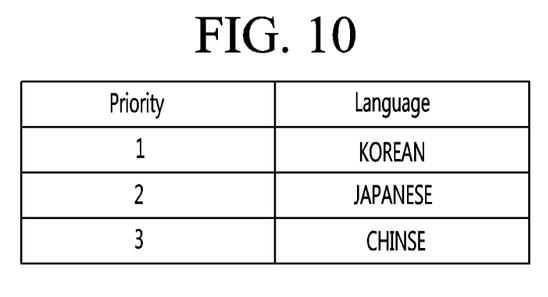

FIGS. 9 and 10 are views illustrating an example of determining a second language based on respective priorities of a plurality of language candidates according to an embodiment of the present invention.

The processor 180 acquires a plurality of language candidates based on the acquired image data or voice data (S901).

The processor 180 may use the language recognized from the voice data or the language recognized from the image data to determine the second language.

That is, the processor 180 may select the languages acquired according to the embodiments of FIGS. 6 to 8 as language candidates.

The processor 180 gives priorities to the plurality of acquired language candidates (S903).

In one embodiment, the processor 180 may give first priority to the language recognized based on the voice data, give second priority to the language recognized using the passport of the image data, and give third priority to the language recognized through the face of the user of the image data.

This is because reliability of the language recognized through the voice data is greater than that of the language recognized through the image data.

However, this is merely an example and priority may be given using other methods. For example, first priority may be given to the language recognized based on the passport recognized from the image data, second priority may be given to the language recognized from the voice data, and third priority may be given to the language recognized based on the face of the user recognized from the image data.

FIG. 10 is a table showing priorities respectively given to the plurality of language candidates.

Referring to FIG. 10, first priority is given to Korean, second priority is given to Japanese and third priority is given to Chinese.

Korean may be recognized through voice data and Japanese and Chinese may be recognized through image data.

The processor 180 determines the second language used to provide the guidance service based on the given priorities (S905).

The processor 180 may determine a language candidate having highest priority among the plurality of language candidates as the second language used to provide the guidance service.

FIG. 5 will be described again.

Meanwhile, the processor 180 may determine the second language based on the position of the robot 100*a*. For example, when the robot 100*a* is located at a specific gate of an airport, the language of the destination of an airplane corresponding to the specific gate may be determined as the second language.

The processor 180 determines whether the determined second language is equal to the first language (S507).

The processor 180 may determine whether the first language set to provide the guidance service is equal to the determined second language or not.

When the second language is equal to the first language, the processor 180 provides the guidance service in the first language (S501).

When the second language is not equal to the first language, the processor 180 changes the language used to provide the guidance service from the first language to the second language (S509).

When the second language is not equal to the first language, the processor 180 may change the setting of the language used to provide the guidance service from the first language to the second language.

The processor 180 may provide the guidance service in the changed second language.

The processor 180 may output the voice recognition result according to the voice of the user in the second language.

That is, the processor 180 may output the voice recognition result in the second language through the sound output unit 152 and in the second language through the display unit 151.

In another example, the processor 180 may display a guidance result according to touch input on the display unit 151 in the second language.

According to the embodiment of the present invention, the robot 100*a* may automatically recognize the language used by the user and provide a guidance service in the recognized language.

Therefore, the user can rapidly receive the guidance service in the language used by the user without input of selecting the language or a voice command, thereby greatly improving convenience.

Figure 11:
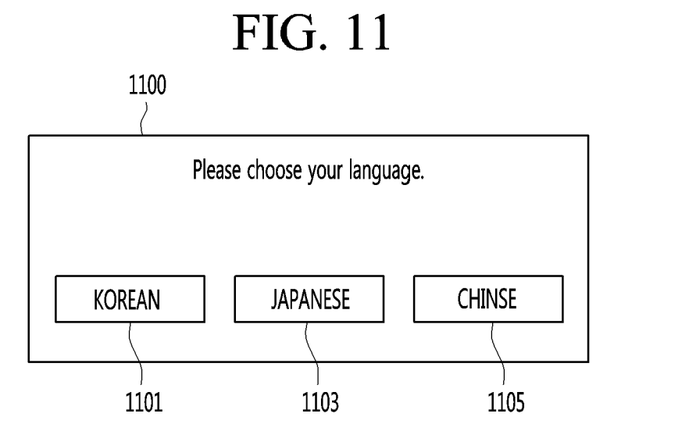
FIG. 11 is a view illustrating a screen capable of selecting a plurality of language candidates recognized based on voice data or image data according to an embodiment of the present invention.

FIG. 11 is a view illustrating a screen capable of selecting a plurality of language candidates recognized based on voice data or image data according to an embodiment of the present invention.

Referring to FIG. 11, a language selection screen 1100 capable of selecting a plurality of language candidates 1101, 1103 and 1105 is shown.

The processor 180 may display the plurality of acquired language candidates 1101, 1103 and 1105 on the display unit 151 based on the voice data or the image data.

The processor 180 may select each language as a language candidate, when recognition reliability of each of the plurality of languages acquired according to the embodiments of FIGS. 6 to 8 is less than reference reliability. The recognition reliability may represent a degree of recognizing the acquired language based on the language recognition model, the object recognition model and the face recognition model. The recognition reliability may be expressed by a probability value of the recognized language.

The robot 100*a* may display the plurality of selected language candidates 1101, 1103 and 1105 in order to enable the user to select a language.

According to the language selection screen 1100 shown in FIG. 11, even if the second language is not determined, a language suitable for the user may be selected as much as possible.

The present invention mentioned in the foregoing description can also be embodied as computer readable codes on a computer-readable recording medium. Examples of possible computer-readable mediums include HDD (Hard Disk Drive), SSD (Solid State Disk), SDD (Silicon Disk Drive), ROM, RAM, CD-ROM, a magnetic tape, a floppy disk, an optical data storage device, etc. The computer may include the processor 180 of the artificial intelligence device.

The invention claimed is:

1. A robot for providing a guidance service in a first language using artificial intelligence, the robot comprising:
    a microphone configured to receive voice data;
    a camera configured to acquire image data;
    an output unit; and
    a processor configured to:
        determine, based on one or more of the voice data or the image data, a second language used to provide the guidance service, change the language used to provide the guidance service from the first language to the second language, based on a determination that the second language is different from the first language, and output the guidance service through the output unit in the changed second language, wherein the processor is further configured to:
give a first priority to a first language candidate recognized based on the voice data;
give a second priority to a second language candidate recognized based on a passport recognized from the image data;
give a third priority to a third language candidate recognized through a face of a user recognized from the image data; and
determine one among the first language candidate, the second language candidate, and the third language candidate as the second language according to a priority.

2. The robot according to claim 1, further comprising a memory configured to store a language recognition model,
wherein the processor is further configured to convert the voice data into text data and determine the second language corresponding to the voice data using the converted text data and the language recognition model, and
wherein the language recognition model is an artificial neural network based model supervised-learned by a deep learning algorithm or a machine learning algorithm.

3. The robot according to claim 1, wherein determining the second language comprises:
recognizing a language based on a shape of the recognized passport or text described on the passport, and determining the recognized language as the second language.

4. The robot according to claim 3, further comprising a memory configured to store an object recognition model for recognizing an object using a deep learning algorithm or a machine learning algorithm,
wherein the processor is further configured to recognize the passport from the image data using the object recognition model.

5. A method of operating a robot for providing a guidance service in a first language using artificial intelligence, the method comprising:
acquiring one or more of voice data or image data;

determining, based on one or more of the voice data or the image data, a second language used to provide the guidance service;
changing the language used to provide the guidance service from the first language to the second language, based on a determination that the second language is different from the first language; and
outputting the guidance service in the changed second language,
wherein determining the second language comprises:
giving a first priority to a first language candidate recognized based on the voice data;
giving a second priority to a second language candidate recognized based on a passport recognized from the image data;
giving a third priority to a third language candidate recognized through a face of a user recognized from the image data; and
determining one among the first language candidate, the second language candidate, and the third language candidate as the second language according to a priority.

6. The method according to claim 5, further comprising converting the voice data into text data,
wherein determining the second language comprises determining the second language corresponding to the voice data using the converted text data and a language recognition model that is stored in a memory, and
wherein the language recognition model is an artificial neural network based model supervised-learned by a deep learning algorithm or a machine learning algorithm.

7. The method according to claim 5, wherein determining the second language comprises:
recognizing a language based on a shape of the recognized passport or text described on the passport, and determining the recognized language as the second language.

8. The method according to claim 7,
wherein the recognizing of the passport comprises recognizing the passport from the image data using an object recognition model,
wherein the object recognition model is an artificial neural network based algorithm for recognizing an object using a deep learning algorithm or a machine learning algorithm.

* * * * *